United States Patent [19]

Chang

[11] Patent Number: 4,528,344
[45] Date of Patent: Jul. 9, 1985

[54] LOW MOLECULAR WEIGHT RESINS FROM NONAROMATIC POLYOLS AND AMINOPLASTS

[75] Inventor: Wen-Hsuan Chang, Gibsonia, Pa.

[73] Assignee: PPG Industries, Inc., Pittsburgh, Pa.

[21] Appl. No.: 612,507

[22] Filed: May 21, 1984

[51] Int. Cl.³ .............................................. C08L 61/28
[52] U.S. Cl. ..................................... 525/509; 528/254
[58] Field of Search ........................ 525/509; 528/254

[56] References Cited

U.S. PATENT DOCUMENTS

| | | | |
|---|---|---|---|
| 2,524,112 | 10/1950 | La Piana et al. | 260/29.4 |
| 2,976,261 | 3/1961 | Wagner et al. | 260/52 |
| 3,310,416 | 3/1967 | Schibler | 106/285 |
| 3,530,054 | 9/1970 | Erikson et al. | 204/181 |
| 3,530,086 | 9/1970 | Porret et al. | 260/30.2 |
| 3,535,318 | 10/1970 | Oppelt et al. | 260/249.6 |
| 3,624,035 | 11/1971 | von Portatius | 260/29.4 R |
| 3,645,973 | 2/1972 | Schibler | 260/67.6 R |
| 3,965,058 | 6/1976 | Yurcheshen et al. | 260/21 |
| 3,966,665 | 6/1976 | Sakata et al. | 260/32.8 R |
| 4,108,816 | 8/1978 | Brown et al. | 260/29.4 R |
| 4,154,891 | 5/1979 | Porter et al. | 428/334 |
| 4,314,923 | 2/1982 | Chang et al. | 525/509 |

OTHER PUBLICATIONS

Improvement in Reactivity of Hexakis-(Methoxymethyl)-Melamine by Self Condensation and Ethylene--Glycol Bridging, by Osamu Ohe from Shikazai Kyokaishi 41 (6), 285-289 (1968).
Journal of Applied Polymer Science, vol. 12, pp. 213-217 (1968).

*Primary Examiner*—Maurice J. Welsh
*Attorney, Agent, or Firm*—Thomas M. Breininger

[57] ABSTRACT

Disclosed herein is an ungelled, crosslinkable, hydroxyl-group containing resin having a molecular weight of less than 4500. The ungelled, hydroxyl-group containing resin is a reaction product of components comprising (A) a nonaromatic polyol having a molecular weight of less than 230, and (B) an aminoplast.

Also disclosed is a curable composition containing such hydroxyl-group containing resin.

18 Claims, No Drawings

LOW MOLECULAR WEIGHT RESINS FROM NONAROMATIC POLYOLS AND AMINOPLASTS

BACKGROUND OF THE INVENTION

Aminoplast resins such as the condensation products of an aldehyde with compounds such as melamine and urea are well known in the art. Additionally, such aminoplast resins which have been etherified to various extents using monohydric alcohols containing from about 1 to 4 carbon atoms, for example hexamethoxymethyl melamine, are also known in the art. Such art known aminoplast resins often are employed, especially in the coatings industry, as crosslinking agents for other thermosetting resins containing active hydrogen atoms as from hydroxyl, amido, and carboxyl groups.

However, a number of disadvantages are attendant upon the use of the known aminoplasts in thermosetting coatings applications. One such disadvantage is undesirable volatilization of the aminoplast with consequent recondensation on the walls of curing ovens under various relatively high temperature, heat curing conditions as for example often exist in curing oil coatings. Often, known aminoplast resins are used to heat cure polyols. It would be desirable if very low molecular weight polyols, such as for example, 1,6-hexanediol, could be utilized in coating compositions which are cured by aminoplast resins, without the many disadvantages that presently militate against their use in such coating compositions. However, when low molecular weight polyols are heat cured with known aminoplast resins, the polyols tend to volatilize from the composition during cure before the crosslinking reaction occurs, thereby giving rise to possible problems of waste due to escape of the volatile materials and possibly undesirable emissions of volatile organic materials to the atmosphere. These problems become increasingly more challenging as the coatings industry attempts to move to the use of coating compositions having higher and higher contents of essentially nonvolatile components.

Another problem arises from the tendency of many low molecular weight polyols to be rather crystalline or solid at room temperature thereby making them incompatible with known aminoplast resins. By incompatible is meant that upon mixing the aminoplast and polyol either do not form a uniform liquid mixture or if they can be made to initially form a uniform liquid mixture as by milding heating, they subsequently phase-separate into a two layer composition.

Additionally, it would be desirable in general, to provide relatively nonvolatile, liquid, low molecular weight thermosetting resins which have viscosities suitable for high-solids coatings applications and yet have a reduced tendency to volatilize during cure.

The present invention is directed to relatively low molecular weight, crosslinkable, resins which can help solve the above problems and to curable compositions, especially coating compositions, containing such resins. These and other objects of the invention will become apparent to one skilled in the art reading the present disclosure.

BRIEF SUMMARY OF THE INVENTION

The present invention provides for an ungelled, crosslinkable, hydroxyl-group containing resin having a molecular weight of less than 4500. An ungelled, hydroxyl-group containing resin of the invention is a reaction product of components comprising (A) a nonaromatic polyol having a molecular weight of less than 230, and (B) an aminoplast.

The present invention also provides for a curable composition containing a hydroxyl-group containing resin of the invention.

DETAILED DESCRIPTION OF THE INVENTION

One of the starting materials required for preparing a resin of the invention is an aminoplast resin. Aminoplast resins are aldehyde condensation products of melamine, urea, and similar compounds. Such products obtained from the reaction of formaldehyde with melamine, urea or benzoguanamine are most common and are preferred herein. However, condensation products of other amines and also amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds include methylurea, benzourea, dicyandiamide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 2,4,6-triethyl-triamino-1,3,5-triazine and the like.

While the aldehyde employed is most often formaldehyde, other similar condensation products can be made from other aldehydes, such as acetaldehyde, crotonaldehyde, acrolein, benzaldehyde, furfural, and others. The aminoplast resins contain methylol or similar alkylol groups, and it is preferred that at least a portion, preferably at least 80 percent, of these alkylol groups are etherified by reaction with an alcohol to provide organic solvent-soluble resins. Any monohydric alcohol can be employed for this purpose, including such alcohols as methanol, ethanol, propanol, butanol, pentanol, hexanol, heptanol and others as well as benzyl alcohol and other aromatic alcohols, cyclic alcohols such as cyclohexanol, monoethers of glycols such as Cellosolves and Carbitols, and halogen-substituted or other substituted alcohols such as 3-chloropropanol. The preferred aminoplast resins are substantially etherified with methanol, ethanol, propanol, or butanol, most preferably methanol, including, for example hexamethoxymethyl melamine. Of the alkyl etherified aminoplasts it is especially preferred to employ those which are essentially monomeric compounds (i.e., essentially free of low molecular weight dimers, trimers, etc.) examples of which include those available from American Cyanamid Company as CYMEL 300 and CYMEL 1130.

The aminoplasts (sometimes referred to as amine-aldehyde condensation products) are produced in the art using acidic or basic catalysts and varying conditions of time and temperature. The aldehyde is often employed as a solution in water or alcohol, and the condensation and etherification reactions may be carried out either sequentially or simultaneously.

Another of the starting materials required for preparing a resin of the invention is a nonaromatic polyol having a molecular weight of less than 230. As used herein the term "nonaromatic polyol" is intended to include both aliphatic and alicyclic polyols. Aliphatic polyols are characterized by having a straight-chain or branched-chain arrangement of carbon atoms in the polyol. Alicyclic polyols are characterized by having an arrangement of carbon atoms in at least one closed ring structure which closed ring structure is not to be confused with an aromatic ring such as the benzene ring.

Examples of the nonaromatic polyols include, but are not limited to, simple diols and higher hydric alcohols such as ethylene glycol; propylene glycol; 1,4-butanediol; 1,3-butanediol; 1,5-pentanediol; 1,6-hexanediol; 2,5-hexanediol; 2-methyl-1,3-pentanediol; 2-ethyl-1,3-hexanediol; 2,2-dimethyl-1,3-propanediol; 2,2,4-trimethyl-1,3-pentanediol; 1,4-cyclohexanediol; 1,4-cyclohexanedimethanol; 1,2-bis(hydroxymethyl)cyclohexane; 1,2-bis(hydroxyethyl)cyclohexane; trimethylolpropane; 2,2-dimethyl-3-hydroxypropyl-2,2-dimethyl-3-hydroxypropionate; diethylene glycol; triethylene glycol; dipropylene glycol; tetraethylene glycol; trimethylolethane; glycerol, sorbitol, and mixtures thereof. It is preferred to employ nonaromatic polyols which are hydrophobic. As used herein a hydrophobic polyol is defined as a polyol containing more than 5 carbon atoms. Of the above nonaromatic polyols, 1,6-hexanediol and 2,2,4-trimethyl-1,3-pentanediol are preferred.

For some purposes it is desirable to include a hydroxyl-containing carboxylic acid in the reaction mixture along with the required components for preparation of a resin of the invention. Examples of the optional hydroxyl-containing carboxylic acids include such compounds as glycolic acid; beta-hydroxy propionic acid; alpha-hydroxy butyric acid; dimethylol propionic acid; mandelic acid; ricinoleic acid; and other hydroxyl-containing carboxylic acids. Of the above optional acids, dimethylolpropionic acid is preferred. When a hydroxyl-containing carboxylic acid is employed in the reaction mixture, for some purposes it is preferred that the resulting product have an acid value equal to or less than 35, most preferably less than or equal to 15.

The relative amounts of nonaromatic polyol and aminoplast employed to prepare the hydroxyl-group containing resin of the invention are such that the ratio of equivalents of the nonaromatic polyol to equivalents of the aminoplast is equal to or less than 2:1, preferably equal to or less than 1.5:1, most preferably equal to or less than 1:1. For purposes of illustration, one mole of 1,6-hexanediol would correspond to 2 equivalents of 1,6-hexanediol, and one mole of hexamethoxymethyl melamine would correspond to 6 equivalents of hexamethoxymethyl melamine. The equivalency of the aminoplast is based on a calculated value of the hydroxy reactive equivalency or functionality of the aminoplast as determined from either the theoretical structure or from the nuclear magnetic resonance (NMR) spectrum. When the aminoplast is a resinous product in which the theoretical structure cannot be determined with accuracy, then NMR can be used to determine the equivalent weight and equivalency of the aminoplast.

The principle involved in determining the equivalent weight of the aminoplast by NMR involves measuring the area under the NMR signal due to the hydrogen in the aldehyde portion of the aminoplast. For example, when the aminoplast is formed from some amine or amide condensed with formaldehyde, the methylene groups derived from the formaldehyde in the melamine resin would include $-NCH_2OH$, $-NCH_2OR-$ and $-NCH_2N-$. These methylene groups give proton NMR signals in the region around 4.5 to about 5.5 ppm down field from TMS (tetramethylsilane used as reference for chemical shift). The area of the $CH_2$ signals is directly proportional to the quantity of $CH_2$ groups present in the resin.

To avoid interference from NMR signals of solvents present in the aminoplast resins, toluene is used as an external reference material. Both the toluene and the aminoplast NMR spectra are recorded under identical experimental conditions. The integrated area of the $CH_2$ groups of melamine resin is compared directly to the area of the methyl groups ($CH_3$) of toluene. The equivalent weight of the resin per mole of $CH_2$ is calculated directly from the ratio of the area in a known concentration of toluene.

In preparing a resin of the invention, the reaction between the nonaromatic polyol and aminoplast can be performed by admixing the components and heating to a moderate temperature, for example up to 200° C. although a higher or lower temperature may be used depending on the desired reaction time. The reaction may be carried out with or without the presence of a small amount of catalyst such as triphenyl phosphite, stannous octoate, or other suitable catalyst. When a catalyst is employed, typically only a small amount of catalyst is used, i.e., up to 0.40 percent by weight of catalyst based on the sum of the weights of the aromatic polyol and aminoplast. Often the amount of catalyst employed in preparing a resin of the invention is up to only 0.030 percent by weight based on the sum of the weights of the aromatic polyol and aminoplast. The reaction between nonaromatic polyol and aminoplast is typically carried out with the removal of the volatile monohydric alcohol byproduct. The extent of reaction can be controlled by stopping the reaction when the desired molecular weight is obtained or typically by stopping the reaction when a viscosity corresponding to that of a product of the desired molecular weight is obtained.

The resins of the invention are low molecular weight products having weight average molecular weights determined by gel permeation chromatography using a polystyrene standard of less than 4,500, preferably less than 4,000 and most preferably less than 3,500.

The weight average molecular weights of the resins of the invention are obtained by gel permeation chromatography using polystyrene standards, a liquid chromatograph from Waters Associates and six micro-Styragel columns. A differential refractometer is used as the detector, and the micro-Styragel columns are arranged according to their pore size. The pore sizes of the micro-Styragel columns are 100 angstroms, 500 angstroms, $10^3$ angstroms, $10^4$ angstroms, $10^5$ angstroms and $10^6$ angstroms. Tetrahydrofuran is used as the solvent at a flow rate of 2.0 milliliters/minute. All of the columns have theoretical plate numbers greater than 3,000 using ortho-dichlorobenzene.

To determine molecular weight by gel permeation chromatography (GPC), the instrument is first calibrated using a polystyrene standard. The polystyrene standards are obtained from Pressure Chemicals Company, Pittsburgh, Pa. and have peak molecular weights of 900,000; 233,000; 50,000; 17,500; and 4,000 with polydispersity indices of 1.1, 1.06, 1.06, 1.04, and 1.06 respectively. The polydispersity index equals weight average molecular weight ($\overline{M}w$) divided by number average molecular weight ($\overline{M}n$). To obtain a calibration curve, a set of 0.1 percent (0.01 grams of standard/10 milliliters of tetrahydrofuran) polystyrene solutions in tetrahydrofuran are prepared and 250 microliters of each of these standards is injected into the series of columns. The calibration curve is generated by plotting the elution times of the resulting peaks versus the common logs of the molecular weights of the standards using a linear least squares fit. The sample of resin whose weight average and number average molecular weights are to be determined is prepared as a 1 percent solution in tetrahydrofuran (i.e., 0.1 gram of resin solids per 10 milliliters of tetrahydrofuran). Then, 250 microliters of the sample solution is injected into the series of columns. As the sample is eluting from the column, a minimum of 250 data points is collected by a computer. Each point consists of the elution time and the intensity of the response at that time (H or height). A molecular weight (M) is assigned to each retention time from the calibration curve. From these molecular weight (M)—height (H) combinations, the following averages are determined:

$$\text{Weight Average Molecular Weight} = \overline{Mw} = \frac{\Sigma HM}{\Sigma H},$$

$$\text{Number Average Molecular Weight} = \overline{Mn} = \frac{\Sigma H}{\Sigma H/M}, \text{ and}$$

$$\text{Polydispersity} = \overline{Mw}/\overline{Mn}.$$

These low molecular weight resins of the invention combine the very desirable features of low volatility, low viscosity, compatibility with organic solvents, and compatibility with a variety of other resins employed, for example, in coatings compositions including but not limited to resins such as hydroxyl-functional resins, examples of which include polyester polyols, acrylic polyols, polyether polyols, polyurethane polyols, polyamide polyols, simple diols and higher hydric alcohols, and the like, as well as generally known epoxy resins and the generally known aminoplast resins examples of which include the aminoplast resins described previously herein for preparation of the resins of the present invention. While it is preferred to use the resins of the invention in combination with other resins such as those referred to immediately above which are coreactive with the resins of the invention, to prepare compositions which cure by means of crosslinking reactions (often referred to as thermosetting compositions although it is contemplated that heat may not be required for crosslinking) the resins of the present invention may be suitable for modifying compositions containing other resins such as the generally known air curable alkyds and also generally known thermoplastic resins such as for example the generally known thermoplastic acrylics often used in coating composition of the lacquer type. The resins of the present invention are particularly suitable for high solids, thermosetting, coating compositions. As used herein a high solids coatings composition contains at least 40 percent by weight, preferably at least 50 percent by weight or higher of substantially nonvolatile solids, based on the total weight of the components of the coating composition.

As indicated previously the resins of the invention contain hydroxyl groups. The hydroxyl values of resins of the invention generally are greater than 40, preferably are greater than 70, and most preferably are greater than 110.

A coating composition of the present invention contains a resin of the invention. A resin of the invention can function as the sole or major film-forming component of a coating composition. However, as indicated previously, it is preferred that the resins of the invention be utilized in coating compositions in combination with other crosslinkable resins which are coreactive with the resins of the invention. Examples of such other crosslinkable resins include the generally known crosslinkable (or thermosetting) resins such as the generally known crosslinkable, acrylics, polyesters, polyethers, polyurethanes, hydroxyl-containing amides, epoxies (particularly for resins of the invention containing carboxyl functionality) and mixtures thereof. It is understood that other resins containing more than one type of moiety which is reactive with the resins of the invention may be utilized in compositions of the invention. Examples of moieties from other resins which are reactive with the resins of the invention include: hydroxyl groups; carboxyl groups; 1,2-epoxy groups; and alkanolamino groups and alkoxyalkylamino groups (e.g., from etherified amine-aldehyde condensates).

Additionally, a coating composition of the invention containing a resin of the invention may contain various additional ingredients generally known for use in coating compositions. Examples of these various ingredients include: fillers; plasticizers; antioxidants; mildewcides and fungicides; surfactants; various flow control agents including, for example, thixotropes and also additives for sag resistance and/or pigment orientation based on polymer microparticles (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932.

The following briefly describes some of the other crosslinkable resins referred to previously which may be employed in combination with the resins of the invention to prepare a coating composition of the invention.

Crosslinkable acrylic resins, such as hydroxyl functional acrylic polymers, which may suitably be employed in coating compositions of this invention are generally known in the art and are prepared by well known techniques. These polymers are prepared by copolymerizing an hydroxy-containing monomer with at least one other monomer containing the $CH_2=C$ group. The preferred hydroxy-containing monomers are the hydroxy alkyl esters of acrylic or methacrylic acid such as, for example, 2-hydroxyethyl acrylate, 2-hydroxyethyl methacrylate, 3-hydroxypropyl methacrylate, 4-hydroxybutyl methacrylate and glycerol allyl ether. Additional examples of hydroxy-containing monomers which may be used include: ethylene glycol allyl ether, propylene glycol allyl ether, butylene glycol allyl ether, diethylene glycol allyl ether, trimethylol propane allyl ether and 2-hydroxymethyl-5-norbornene (either the endo isomer or the exo isomer or mixtures thereof). Examples of other monomers containing the $CH_2=C$ group which can be copolymerized with the hydroxy-containing monomer include the alkyl acrylates and alkyl methacrylates such as methyl acrylate, ethyl acrylate, butyl acrylate, propyl acrylate, 2-ethylhexyl acrylate, methyl methacrylate, butyl methacrylate, 2-ethylhexyl methacrylate, decyl methacrylate, and lauryl methacrylate; unsaturated nitriles such as acrylonitrile, mechacrylonitrile, and ethacrylonitrile; vinyl aromatic hydrocarbons such as styrene, alpha methyl styrene and vinyl toluene; vinyl acetate; vinyl chloride; unsaturated epoxy functional monomers such as glycidyl methacrylate; carboxyl group-containing monomers such as acrylic acid, methacrylic acid, crotonic acid, monobutyl maleate, and maleic acid and the like; and unsaturated silicon-containing monomers such as gamma-methacryloxypropyl triethoxysilane, gamma-acryloxypropyltriethoxysilane, gamma-methacryloxypropyltriacetoxysilane and the like.

Crosslinkable polyester resins, such as polyester polyols, which may suitably be employed in coating compositions of this invention are generally known in the art. Polyester polyols are prepared by conventional techniques utilizing simple diols, and higher hydric alcohols known in the art (optionally in combination with monohydric alcohols) with polycarboxylic acids. Examples of the simple diols and higher hydric alcohols include: ethylene glycol; propylene glycol; butylene glycol; hexylene glycol; hydrogenated bisphenol-A; 1,4-butanediol; 1,3-butanediol; 2,2,4-trimethylpentanediol; 1,5-pentanediol; 2,4-pentanediol; 1,6-hexanediol; 2,5-hexanediol; 2-methyl-1,3-pentanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2-2-dimethyl-3-hydroxypropionate; diethylene glycol; dipropylene glycol; the alkoxylation product of 1 mole of 2,2-bis(4-hydroxyphenyl)propane (i.e., bisphenol-A) and 2 moles of propylene oxide available a DOW-565 from Dow Chemical Company; and the like; the polyether glycols such as poly(oxypropylene)glycol and poly(oxytetramethylene)glycol; trimethylolpropane, trimethylolethane; pentaerythritol; caprolactone triol (e.g.) the reaction product of caprolactone and trimethylolpropane and the like. Examples of suitable polycarboxylic acids include; phthalic acid; isophthalic acid; terephthalic acid; trimellitic acid; adipic acid; azelaic acid; sebacic acid; succinic acid; malic acid, glutaric acid; malonic acid; pimelic acid; suberic acid; 2,2-dimethylsuccinic acid; 3,3-dimethylglutaric acid; 2,2-dimethylglutaric acid; maleic acid; fumaric acid; itaconic acid; and the like. Anhydrides of the above acids, where they exist, can also be employed and are encompassed by the term "polycarboxylic acid." In addition, certain compounds which react in a manner similar to acids to form polyester polyols are also useful. Such materials include lactones such as caprolactone propylolactone and methyl caprolactone, and hydroxy acids such as hydroxy caproic acid and dimethylolpropionic acid. If a triol or other higher hydric alcohol is used, a monocarboxylic acid, such as acetic acid and benzoic acid, may be used in the preparation of the polyester polyol. Moreover the polyester polyols useful for coating compositions of the invention include polyester polyols modified with fatty acids or glyceride oils of fatty acids (i.e., conventional alkyd polyols containing such modification). Other suitable polyester polyols may be prepared by reacting an alkylene oxide such as ethylene oxide, propylene oxide, butylglycidyl ether, and the glycidyl esters of organic acids such as CARDURA-E, with the carboxylic acid to form the corresponding ester. Examples of the optional monohydric alcohols which may be used to prepare the polyester polyols include: ethanol; propanol; isopropanol; n-pentanol; neopentyl alcohol; 2-ethoxyethanol; 2-methoxyethanol; 1-hexanol; cyclohexanol; 2-methyl-2-hexanol; 2-ethylhexyl alcohol; 1-octanol; 1-nonanol; isodecyl alcohol; and the like.

Crosslinkable polyethers such as polyether polyols which may suitably be employed in coating compositions of this invention are generally known and are prepared by well known techniques. Examples of polyether polyols include the poly(oxyalkylene)glycols prepared by the acid or base catalyzed addition of an alkylene oxide such as ethylene oxide and/or propylene oxide to initiator compounds such as ethylene glycol, propylene glycol, diethylene glycol, dipropylene glycol, trimethylolpropane, glycerol, pentaerythritol, sorbitol, sucrose and the like. Additional examples of polyether polyols include the generally known poly(oxytetramethylene)glycols prepared by the polymerization of tetrahydrofuran in the presence of Lewis acid catalysts such as boron trifluoride, tin (IV) chloride, antimony pentachloride, antimony trichloride, phosphorous pentafluoride, and sulfonyl chloride. Other examples of polyether polyols include the generally known reaction products of 1,2-epoxide-containing compounds with polyols such as those included in the description of simple diols and higher hydric alcohols above.

Crosslinkable amide-containing polyols which may suitably be employed in coating compositions of this invention are generally known and are prepared by well known techniques. They typically are prepared from any of the above-described diacids or lactones and diols and higher hydric alcohols, and diamines or aminoalcohols as illustrated, for examples, by the reaction of neopentyl glycol, adipic acid and hexamethylenediamine. Amide-containing polyols also may be prepared through aminolysis by the reaction, for example, of carboxylates, carboxylic acids, or lactones with aminoalcohols. Examples of suitable diamines and aminoalcohols include hexamethylenediamine; ethylenediamine, phenylenediamines, toluenediamines, monoethanolamine, diethanolamine, N-methyl-monoethanolamine, isophorone diamine, 1,8-menthanediamine, and the like.

Hydroxyl-containing polyurethanes or polyurethane polyols which may suitably be employed in coating compositions of this invention are generally known and are prepared by well known techniques. They can be produced by reacting any of the above-described polyols, including diols and higher hydric alcohols, acrylic polyols, polyester polyols, polyether polyols, and amide-containing polyols with an organic polyisocyanate. The organic polyisocyanate may be reacted with the polyol either directly to form the polyurethane polyol or by the generally known prepolymer technique wherein the polyol and polyisocyanate are reacted in relative proportions to first produce, an isocyanate-functional prepolymer with subsequent reaction of the prepolymer with additional polyol to form the polyurethane polyol. Also, mixtures of organic isocyanate prepolymers with monomeric isocyanates (so-called semi-prepolymers) may be employed in the prepolymer technique. The polyisocyanate which is reacted with the polyol essentially can be any organic polyisocyanate. The polyisocyanate may be aromatic, aliphatic, cycloaliphatic, or heterocyclic and may be unsubstituted or substituted with groups such as halogen, etc. Many such organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; p-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)fumarate; isophorone diisocyanate; ethylene diisocyanate; dodecane-1,12-diisocyanate;ocyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates and monoisocyanates may be utilized as the polyisocyanate for preparing the hydrophobic polyurethane polyols.

Particularly where the resins of the invention incorporate a hydroxyl-containing carboxylic acid as described previously, a coating composition of the invention may contain an epoxy resin. Epoxy resins, often referred to simply as "epoxies" are generally known and are prepared by well known techniques. They are compounds or mixtures of compounds containing at least one, typically more than one 1,2-epoxy group of the formula

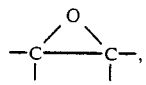

i.e., polyepoxides. The polyepoxides may be saturated or unsaturated, aliphatic, cycloaliphatic, aromatic or heterocyclic. Examples of suitable polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and the hydrogenated derivatives thereof. The polyglycidyl ethers of polyphenols of various molecular weights may be produced, for example, by varying the mole ratio of epichlorohydrin to polyphenol in known manner. Epoxy resins also include the polyglycidyl ethers of mononuclear polyhydric phenols such as the polyglycidyl ethers of resorcinol, pyrogallol, hydroquinone, and pyrocatechol. Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2-hexanetriol, pentaerythritol, and 2,2-bis(4-hydroxycyclohexyl)propane. Epoxy resins additionally include polyglycidyl esters of polycarboxylic acids such as the generally known polyglycidyl esters of adipic acid, phthalic acid, and the like. Addition polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate. Many additional examples of epoxy resins are described in the Handbook of Epoxy Resins, Henry Lee and Kris Neville, 1967, McGraw Hill Book Company.

Since a resin of the invention is hydroxyl-functional it can be cured with generally known aminoplast resins of the types described previously for preparation of a resin of the invention. Additionally, since a resin of the invention contains residual reactive groups from the aminoplast utilized in preparation of the resin, a resin of the invention may be utilized in substitution for at least part of the generally known aminoplast in a crosslinkable coating composition which can be cured by a generally known aminoplast resin, to provide desired characteristics in a cured film prepared therefrom.

As indicated previously, the resins of the present invention can provide a number of advantages to coating compositions prepared from these resins. For example, since the low molecular weight nonaromatic polyol is bound to the aminoplast, a resin of the invention can help reduce the volatilization of aminoplast and/or low molecular weight polyol from coating compositions cured at elevated temperatures as are typical for example in coil coatings operations. An additional benefit for such compositions is that where desired, low molecular weight polyols can be incorporated in films cured at such elevated temperatures with a substantial reduction in the loss of the low molecular weight polyol upon cure. This makes the use of such low molecular weight polyols for the desirable properties which they may impart to a cured film much more attractive in such compositions cured at elevated temperatures.

Moreover the present invention also helps to solve the incompatiblity problems which exist between low molecular weight polyols which are solid or crystalline at room temperature and generally known aminoplast resins.

As indicated previously coating compositions of the invention can be pigmented or unpigmented. Pigments suitable for a composition of the invention include a wide variety of pigments generally known for use in coating compositions. Suitable pigments include both metallic-flake pigments and various white and colored pigments.

Examples of metallic-flake pigments include the conventional metallic flakes such as aluminum flakes, nickel flakes, tin flakes, silver flakes, chromium flakes, stainless steel flakes, gold flakes, copper flakes and combinationes thereof. Of the metallic-flake pigments, nonleafing aluminum flakes are preferred.

Examples of white and colored pigments include generally known pigments based on metal oxides; metal hydroxides; metal sulfides; metal sulfates; metal carbonates; carbon black; china clay; phthalo blues and greens, organo reds, and other organic dyes.

Typically a composition of the invention also contains an organic solvent which may be any solvent or solvent mixture in which the materials employed are compatible and soluble to the desired extent.

Additionally coating compositios of the invention depending on the type of crosslinkable resins in addition to the resin of the invention which may be employed therein may contain a suitable catalyst to enhance the cure of the coating composition. Suitable catalysts include those customarily employed to promote reaction between the reactive moieties from the resin of the invention capable of entering into crosslinking reactions with coreactive moieties from the other crosslinkable resins which can be employed in a coating composition of the invention. The moieties from the resin of the invention capable of entering into the aforesaid crosslinking reactions include residual hydroxyl groups from the nonaromatic polyol and residual reactive groups such as, for example, residual alkoxyalkylamino groups from an aminoplast resin such as hexamethoxymethylmelamine. Examples of typical catalysts which may be employed in coating compositions of the invention include paratoluenesulfonic acid, stannous octoate, dibutyltin dilaurate, naphthalene sulfonic acid, naphthalene disulfonic acid, the organic esters of the sulfonic acids, and the like.

The compositions of the invention can be applied by any conventional method, including brushing, dipping, flow coating, etc. to a wide variety of substrates such as wood, metals, glass, cloth plastics, foams and the like, as well as over primers.

The examples which follow are submitted for the purpose of further illustrating the nature of the present invention and should not be regarded as a limitation on the scope thereof.

EXAMPLE 1

(a) A composition of hydrolyzed triphenylphosphite is prepared as follows. A reaction vessel is charged at room temperature with 310 grams (g) of triphenylphosphite (from Borg Warner) and 18 g of water. The contents of the vessel are heaed to a maximum temperature of 63° C. while stirring until a homogeneous composition having a refractive index of 1.5540 results.

(b) A reaction vessel equipped with steam condenser, claisen head, thermometers, source of nitrogen and stirrer is charged at room temperature under a blanket of nitrogen with 3230 g of 2,2,4-trimethyl-1,3-pentanediol, 4314 g of hexakis methoxymethylmelamine (available as CYMEL-300 from American Cyanamid Company) and 15.57 g of the hydrolyzed triphenylphosphite as prepared in part (a) immediately above. The reaction mixture is heated and distillate is collected according to the schedule set forth in the following TABLE 1. The temperature of the reaction mixture and the head temperature of the distillation column are given for the end of each corresponding time period. The amount of distillate as represented in each horizontal row represents the total distillate collected up to the end of the corresponding time period (i.e., including that collected during the preceding time period). The total distillate collected is 850 millimeters (ml) which weights 680 g.

TABLE 1

| Time (min.) | Temperature of Reaction Vessel (°C.) | Head Temperature (°C.) | Total Distillate Collected (ml) |
| --- | --- | --- | --- |
| 0–60 | 120 | 67 | 540 |
| 60–75 | 124 | 67 | 690 |
| 75–83 | 124 | 67 | 750 |
| 83–93 | 124 | 67 | 800 |
| 93–107 | 120 | 65 | 820 |

TABLE 1-continued

| Time (min.) | Temperature of Reaction Vessel (°C.) | Head Temperature (°C.) | Total Distillate Collected (ml) |
| --- | --- | --- | --- |
| 107–120 | 110 | * | 830 |
| 120–135 | 110 | 58 | 840 |
| 135–165 | 100 | * | 850 |

*Not recorded.

The resulting product represents a resin of the invention. A mixture of 85 percent (%) by weight of the product and 15% by weight of methylisobutyl ketone has a Gardner-Holdt bubble tube viscosity of 8 seconds (T-U). The product has a number average molecular weight of 572 and a weight average molecular weight of 1393 as determined by gel permeation chromatography (GPC) using a polystyrene standard.

EXAMPLE 2

A reaction vessel is charged at room temperature with 396 g of 2,2,4-trimethyl-1,3-pentanediol, 352 g of hexakis methoxymethylmelamine (available as CYMEL-303 from American Cyanamid Company), and 0.2 g of stannous octoate. The reaction mixture is heated from room temperature to 200° C. over a period of 3 hours and 29 minutes whereupon heating is discontinued. During the heating of the reaction mixture a total of 93.1 g of volatile material is allowed to escape from the reaction vessel.

The resulting product represents a resin of the invention. A mixture of 85% by weight of the product and 15% by weight of methylisobutyl ketone has a Gardner-Holdt bubble tube viscosity of 16 seconds (Y-). The product has a number average molecular weight of 591 and a weight average molecular weight of 1853 as determined by gel permeation chromatography using a polystyrene standard.

EXAMPLE 3

A reaction vessel equipped as described in Example 1(b) is charged at room temperature under a blanket of nitrogen with 1445 g of 2,2,4-trimethyl-1,3-pentanediol, 2554 g (4.95 moles) of a hexaalkoxymethylmelamine resin having about a 1 to 1 mole ratio of methoxymethyl to butoxymethyl groups (available as RESIMENE 755 from Monsanto Company), and 8 g of the hydrolyzed triphenylphosphite as prepared in Example 1(a). The reaction mixture is heated and distillate is collected according to the schedule set forth in the following TABLE 2. The total distillate collected is 590 ml which weighs 488 g. As determined by gas chromatography the distillate contains 47.6% by weight methanol and 52% by weight butanol.

TABLE 2

| Time (min.) | Temperature of Reaction Vessel (°C.) | Head Temperature (°C.) | Total Distillate Collected (ml) |
| --- | --- | --- | --- |
| 0–61 | 130 | 83 | 40 |
| 61–70 | 136 | 90 | 120 |
| 70–80 | 138 | 87 | 200 |
| 80–87 | 140 | 86 | 255 |
| 87–105 | 144 | 91 | 350 |
| 105–120 | 148 | 91 | 450 |
| 120–128 | 152 | 91 | 500 |
| 128–132 | 158 | 91 | 570 |
| * | 120 | Not recorded | 590 |

*Heating is discontinued and the contents of the reaction vessel are allowed to cool.

The resulting product represents a resin of the invention. The product has a number average molecular weight of 991 and a weight average molecular weight of 2813 as determined by GPC using a polystyrene standard. A mixture of 371 g of the product and 41 g of xylene has a Gardner-Holdt bubble tube viscosity of 63 seconds (56.2 stokes, a solids content measured at 105° C. for 2 hours (105° C./2 hr) of 82.5% by weight and a solids content at 150° C./2 hr) of 77.4% by weight.

EXAMPLE 4

A reaction vessel equipped as described in Example 1(b) is charged at room temperature under a blanket of nitrogen with 3618 g of 1,6-hexanediol, 4783 g of hexamethoxymethylmelamine (CYMEL-300), and 2 g of triphenylphosphite (from Borg Warner). The reaction mixture is heated and distillate is collected according to the schedule set forth in the following TABLE 3. The total distillate collected is 870 ml which weighs 720 g. As determined by gas chromatography, the distillate contains 11.4% by weight of 1,6-hexanediol.

TABLE 3

| Time (min.) | Temperature of Reaction Vessel (°C.) | Head Temperature (°C.) | Total Distillate Collected (ml) |
|---|---|---|---|
| 0-40 | 156 | 92 | 100 |
| 40-55 | — | 85 | 250 |
| 55-73 | 160 | 83 | 350 |
| 73-89 | 166 | 86 | 500 |
| 89-93 | — | 78 | 550 |
| 93-105 | 164 | — | 600 |
| 105-138 | 162 | 69 | 700 |
| 138-185 | 160 | 64 | 800 |
| 185-194 | 160 | — | 825 |
| 204-223 | 146 | 55 | 860 |
| 223-233 | 140 | 46 | 870 |

The resulting product represents a resin of the invention and has a theoretical hydroxyl value of about 286 and a measured hydroxyl value in the range of 284 to 298. The product has a Gardner-Holdt bubble tube viscosity of 42 seconds ($Z^{1+}$) or 31.7 stokes. The product has a number average molecular weight of 459 and a weight average molecular weight of 2156 as determined by GPC using a polystyrene standard.

EXAMPLE 5

A reaction vessel equipped as described in Example 1(b) is charged at room temperature under a blanket of nitrogen with 3618 g of 1,6-hexanediol, 5517 g of an alkylated melamine-aldehyde condensate available as CYMEL-1130 from American Cyanamid Company, and 2.2 g of triphenylphosphite (from Borg Warner). The reaction mixture is heated and distillate is collected according to the schedule set forth in the following TABLE 4. The total distillate collected is 880 ml which weighs 737.6 g.

TABLE 4

| Time (min.) | Temperature of Reaction Vessel (°C.) | Head Temperature (°C.) | Total Distillate Collected (ml) |
|---|---|---|---|
| 0-135 | 192 | 118 | 75 |
| 135-139 | 192 | 114 | 100 |
| 139-175 | 190 | 104 | 250 |
| 175-202 | 194 | 128 | 450 |
| 202-209 | 192 | 126 | 500 |
| 209-219 | 192 | 130 | 635 |
| 219-226 | 190 | 122 | 700 |
| 226-236 | 184 | 98 | 775 |
| 236-255 | 176 | 86 | 870 |//

TABLE 4-continued

| Time (min.) | Temperature of Reaction Vessel (°C.) | Head Temperature (°C.) | Total Distillate Collected (ml) |
|---|---|---|---|
| 255-272 | 130 | 27 | 880 |

The resulting product represents a resin of the invention. The product has a Gardner-Holdt bubble tube viscosity of 40.5 seconds ($Z^{1+}$). The product has a number average molecular weight of 483 and a weight average molecular weight of 3508 as determined by GPC using a polystyrene standard.

EXAMPLE 6

A reaction vessel equipped as described in Example 1(b) is charged at room temperature under a blanket of nitrogen with 3275.6 g of propylene glycol, 6723.6 g of hexamethoxymethylmelamine (CYMEL-303), and 10 g of an ultraviolet light stabilizer (TINUVIN-P from Ciba-Geigy Corp.). The reaction mixture is heated and distillate is collected according to the schedule set forth in the following TABLE 5. The total distillate collected is 1175 ml which weighs 949 g.

TABLE 5

| Time (min.) | Temperature of Reaction Vessel (°C.) | Head Temperature (°C.) | Total Distillate Collected (ml) |
|---|---|---|---|
| 0-107 | 142 | 66 | 120 |
| 107-180 | 150 | 77 | 345 |
| 180-225 | 151 | 76 | 440 |
| 225-345 | 152 | 75 | 680 |
| * | | | |
| 0-190 | 146 | 65 | 770 |
| 190-216 | 146 | 66 | 810 |
| 216-252 | 148 | 67 | 870 |
| 252-289 | 150 | 66 | 940 |
| 289-307 | 152 | 66 | 980 |
| 307-329 | 154 | 69 | 1030 |
| 329-342 | 154 | 68 | 1055 |
| * | | | |
| 0-40 | 148 | — | 1085 |
| 40-87 | — | 64 | 1095 |
| 87-185 | 146 | 65 | 1135 |
| 185-202 | 146 | 64 | 1155 |
| 202-217 | 146 | 65 | 1175 |

*Heating is discontinued and the contents of the reaction vessel are allowed to cool.

The resulting product represents a resin of the invention. The product has a Gardner-Holdt bubble tube viscosity of 99 seconds ($Z^{4+}$) or 66.15 stokes, an acid value of 0.3, a water content of 0.27% by weight, a solids content at 105° C./2 hr of 83.4% by weight, a theoretical hydroxyl value of about 350 and a measured hydroxyl value in the range of 337.8 to 347. The product has a number average molecular weight of 451 and a weight average molecular weight of 1541 as determined by GPC using a polystyrene standard.

EXAMPLE 7

A reaction vessel equipped as described in Example 1(b) is charged at room temperature under a blanket of nitrogen with 2804.4 g of propylene glycol, 7195.5 g of hexamethoxymethylmelamine (CYMEL-300), and 30 g of triphenylphosphite (from Borg Warner). The reaction mixture is heated and distillate is collected according to the schedule set forth in the following TABLE 6. The total distillate collected is 1100 ml which weighs 874 g.

TABLE 6

| Time (min.) | Temperature of Reaction Vessel (°C.) | Head Temperature (°C.) | Total Distillate Collected (ml) |
|---|---|---|---|
| 0–45 | — | 85 | 180 |
| 45–47 | 104 | 74 | 250 |
| 47–51 | 102 | 69 | 300 |
| 51–* | 100 | 75 | 380 |
| *–62 | 100 | 73 | 500 |
| 62–73 | 100 | 71 | 625 |
| 73–92 | 100 | 70 | 850 |
| 92–105 | 99 | 69 | 950 |
| 105–115 | 99 | 69 | 1000 |
| 115–125 | 92 | — | 1100 |

*Not recorded.

The resulting product represents a resin of the invention. The product has a Gardner-Holdt bubble tube viscosity of 42 seconds or 30.5 stokes, an acid value of 0.57, a water content of 0.31% by weight, a solids content at 105° C./2 hr of 81.8% by weight, a theoretical hydroxyl value of about 286 and a measured hydroxyl value in the range of 279 to 280. The product has a number average molecular weight of 475 and a weight average molecular weight of 1511 as determined by GPC using a polystyrene standard.

EXAMPLE 8

This example illustrates the use of a resin of the invention in a curable composition of the invention.

(a) A reaction vessel equipped as described in Example 1(b) is charged at room temperature under a blanket of nitrogen with 7,493 g of 2,2,4-trimethyl-1,3-pentanediol, 10,007 g of hexakis methoxymethylmelamine (available as CYMEL-300 from American Cyanamid Company), and 36.2 g of triphenylphosphite (from Borg Warner). The reaction mixture is heated and distillate is collected according to the schedule set forth in the following TABLE 7. The total distillate collected is 2,145 ml which has a mass of 1,749 g.

TABLE 7

| Time (min.) | Temperature of Reaction Vessel (°C.) | Head Temperature (°C.) | Total Distillate Collected (ml) |
|---|---|---|---|
| 0–63 | 110 | — | — |
| 63–79 | 130 | 90 | 100 |
| 79–85 | — | — | 190 |
| 85–88 | 128 | 85 | 250 |
| 88–91 | 128 | 82 | 300 |
| 91–101 | 126 | 77 | 500 |
| 101–135 | 128 | 76 | 1,000 |
| 135–175 | 134 | 76 | 1,500 |
| 175–201 | 140 | — | 1,800 |
| 201–211 | 144 | — | 1,920 |
| 211–225 | 144 | — | 2,000 |
| 225–245 | 142 | — | 2,108 |
| 245–** | — | — | 2,145 |

*Heating is discontinued and the contents of the reaction vessel are allowed to cool.
**Not recorded.

The resulting product represents a resin of the invention. With 3,330 g of the product is admixed 370 g of xylene to give a composition (hereinafter designated Composition 7a) having a Gardner-Holdt bubble tube viscosity of 52.5 seconds (Z2+) and a theoretical solids content of 90 percent by weight. Composition 7a is utilized in part (b) immediately below.

(b) A curable composition of the invention (herein designated Composition 7b) is prepared by mixing the components in the amounts set forth in the following TABLE 8.

TABLE 8

| Curable Composition 7b | |
|---|---|
| Component | Amount (grams) |
| (1) Pigment dispersion[1] | 75.0 |
| (2) Acrylic resin[2] | 6.6 |
| (3) Composition 7a[3] | 25.1 |
| (4) Epoxy resin[4] | 8.0 |
| (5) Xylene | 28.2 |
| (6) Catalyst[5] | 0.5 |

[1] A pigment dispersion prepared by grinding 1,600 g of titanium dioxide (TRONOX CR 800 from Kerr-McGee) in 121.6 g of methylamyl ketone and 670.4 g of the acrylic resin described in footnote 2 immediately following. The pigment dispersion is ground to a No. 7.5+ Hegman value.
[2] An acrylic resin prepared by reacting 672.0 g of hydroxypropyl acrylate, 1,097.6 g of styrene, 380.8 g of butyl acrylate, and 89.6 g of methacrylic acid in a total of 864.0 g of methylamyl-ketone and 96.0 g of butanol. A total of 129.92 g of VAZO 67, believed to be Azobis (2-methylbutyronitrile) is utilized as the initiator in the preparation of the acrylic resin. The resulting resin composition has a viscosity of 75.4 stokes, an acid value of 19.4, a total solids content measured at 150° C. for 2 hours of 68.2 percent by weight, and a peak molecular weight determined by gel permeation chromatography of 8,949.
[3] As described in part (a) immediately above.
[4] A solution of 75 percent by weight of EPON 1001 (from Shell Chemical Company) in toluene.
[5] A solution of 40 percent by weight of paratoluenesulfonic acid in 60 percent by weight of butanol.

Composition 7b has a No. 3 Zahn Cup viscosity at 75° F. (24° C.) of 11.7 seconds.

Composition 7b is spray applied to a zinc phosphate treated steel panel (METABOND 50) and cured for 20 minutes at 350° F. (177° C.). The resulting cured films has a dry film thickness of 1.2 mils ($3.0 \times 10$-5 meters), a 60 degree gloss of 79, a pencil hardness of 4H, and passes a direct impact of 40 inch pounds and a reverse impact of 4 inch pounds utilizing a Gardner impact tester.

What is claimed is:

1. An ungelled, crosslinkable, hydroxyl group-containing resin having a weight average molecular weight of less than 4500 which is a reaction product of components comprising:
    (A) a nonaromatic polyol having a molecular weight of less than 230, and
    (B) an aminoplast.

2. The resin of claim 1 wherein said aminoplast is at least partially etherified by a monohydric alcohol containing from 1 to 4 carbon atoms.

3. The resin of claim 1 which is a reaction product of said components additionally comprising a hydroxyl-containing carboxylic acid.

4. The resin of claim 3 having an acid value equal to or less than 35.

5. The resin of claim 1 wherein said nonaromatic polyol and said aminoplast for said reaction product are in a ratio of equivalents of said polyol to said aminoplast equal to or less than 2:1.

6. The resin of claim 1 wherein said nonaromatic polyol and said aminoplast for said reaction product are in a ratio of equivalents of said polyol to said aminoplast equal to or less than 1.5:1.

7. The resin of claim 1 wherein said nonaromatic polyol contains more than 5 carbon atoms.

8. The resin of claim 1 wherein said aminoplast is selected from the group consisting of a melamine-aldehyde condensation product, a urea-aldehyde condensation product, and a mixture thereof.

9. The resin of claim 1 having a weight average molecular weight of less than 3,000.

10. A curable composition comprising:

I. an ungelled, crosslinkable, hydroxyl-group containing resin having a weight average molecular weight of less than 4500 which is a reaction product of components comprising
  (A) a nonaromatic polyol having a molecular weight of less than 230, and
  (B) an aminoplast; and
II. at least one other crosslinkable resin.

11. The curable composition of claim 10 wherein said other crosslinkable resin is coreactive with said ungelled, crosslinkable, hydroxyl-group containing resin.

12. The curable composition of claim 10 wherein said aminoplast is at least partially etherified by a monohydric alcohol containing from 1 to 4 carbon atoms.

13. The curable composition of claim 10 wherein said hydroxyl-group containing resin is a reaction product of said components additionally comprising a hydroxyl-group containing carboxylic acid.

14. The curable composition of claim 10 wherein said nonaromatic polyol and said aminoplast for said reaction product are in a ratio of equivalents of said polyol to said aminoplast equal to or less than 2/1.

15. The curable composition of claim 10 wherein said nonaromatic polyol and said aminoplast for said reaction product are in a ratio of equivalents of said polyol to said aminoplast equal to or less than 1.5:1.

16. The curable composition of claim 10 wherein said nonaromatic polyol contains more than 5 carbon atoms.

17. The curable composition of claim 10 wherein said aminoplast is selected from the group consisting of a melamine-aldehyde condensation product, a urea-aldehyde condensation product, and a mixture thereof.

18. The curable composition of claim 10 wherein said ungelled crosslinkable, hydroxyl group-containing resin has a weight average molecular weight of less than 3,000.

* * * * *